(12) United States Patent
Wallner

(10) Patent No.: US 11,427,974 B2
(45) Date of Patent: Aug. 30, 2022

(54) SPREADING DEVICE FOR SPREADING VEHICLES

(71) Applicant: Gmeiner GmbH, Wernberg-Koblitz (DE)

(72) Inventor: Johannes Wallner, Pleystein (DE)

(73) Assignee: Gmeiner GmbH, Wernberg-Koblitz (DE)

( * ) Notice: Subject to any disclaimer, the term of this patent is extended or adjusted under 35 U.S.C. 154(b) by 304 days.

(21) Appl. No.: 15/733,117

(22) PCT Filed: Dec. 3, 2018

(86) PCT No.: PCT/EP2018/083279
§ 371 (c)(1),
(2) Date: May 20, 2020

(87) PCT Pub. No.: WO2019/110471
PCT Pub. Date: Jun. 13, 2019

(65) Prior Publication Data
US 2020/0318295 A1 Oct. 8, 2020

(30) Foreign Application Priority Data
Dec. 5, 2017 (DE) .......................... 202017107399.8

(51) Int. Cl.
*E01C 19/21* (2006.01)
*B05B 3/12* (2006.01)
(Continued)

(52) U.S. Cl.
CPC ................ *E01C 19/21* (2013.01); *B05B 3/12* (2013.01); *E01C 19/176* (2013.01);
(Continued)

(58) Field of Classification Search
CPC ...... E01C 19/21; E01C 19/176; E01C 19/203; E01H 10/007; B05B 3/12
See application file for complete search history.

(56) References Cited

U.S. PATENT DOCUMENTS 4,892,255 A * 1/1990 Waldrum ............. A01C 17/001
D12/345
6,793,154 B2 9/2004 Kost
(Continued)

FOREIGN PATENT DOCUMENTS

DE 1457818 A1 5/1969
DE 202017101056 U1 4/2017
(Continued)

*Primary Examiner* — Abigail A Risic
(74) *Attorney, Agent, or Firm* — Welsh Flaxman & Gitler LLC

(57) ABSTRACT

A spreading device is disclosed for spreading vehicles for discharging spreading agents. The spreading device includes at least one tank for receiving liquid spreading agents to be spread and at least one rotationally-driven discharge device, connected via a provided supply unit to the tank. The discharge device has at least one base body and one cover securely connected to the base body, wherein the base body defines a receiving chamber (AR) for the supplied liquid spreading agent and is in the shape of a cylinder. The base body has at least one bottom section, forming an underside (U) of the discharge device, with an inlet opening and at least one wall section projecting from the bottom section and concentrically surrounding an axis of rotation (RA). The discharge device has multiple discharge units, each having a discharge opening, for dispensing the liquid spreading agent from the receiving chamber (AR).

19 Claims, 8 Drawing Sheets

(51) Int. Cl.
*E01C 19/17* (2006.01)
*E01C 19/20* (2006.01)
*E01H 10/00* (2006.01)
*A01C 17/00* (2006.01)
*A01C 23/04* (2006.01)
*A01M 11/00* (2006.01)

(52) U.S. Cl.
CPC ......... *E01C 19/203* (2013.01); *E01H 10/007* (2013.01); *A01C 17/001* (2013.01); *A01C 23/047* (2013.01); *A01M 11/00* (2013.01)

(56) References Cited

U.S. PATENT DOCUMENTS

| | | | |
|---|---|---|---|
| 2009/0173800 A1* | 7/2009 | Perkes | E01H 10/007 239/10 |
| 2010/0163644 A1* | 7/2010 | Dieziger | B05B 3/063 239/222.17 |
| 2013/0233938 A1* | 9/2013 | Norkus | E01C 19/203 239/7 |
| 2016/0222603 A1* | 8/2016 | Cervelli | E01C 19/2025 |
| 2017/0314214 A1* | 11/2017 | Christian | B05B 1/3053 |
| 2019/0062558 A1* | 2/2019 | LaRusso | E01C 23/06 |

FOREIGN PATENT DOCUMENTS

| | | | | |
|---|---|---|---|---|
| EP | 0635196 | A1 | 1/1995 | |
| FR | 2776474 | A1 * | 10/1999 | ............ A01M 7/006 |
| GB | 2064283 | A | 6/1981 | |
| JP | 2010024723 | A | 2/2010 | |
| JP | 3189781 | U | 4/2014 | |
| KR | 100465480 | A | 3/2004 | |
| KR | 20040018671 | A | 3/2004 | |
| KR | 200481961 | Y1 | 12/2016 | |
| RU | 2139970 | C1 | 10/1999 | |
| RU | 2394126 | C1 | 7/2010 | |
| SU | 1206360 | A1 | 1/1986 | |
| WO | 2007015284 | A2 | 2/2007 | |

* cited by examiner

SPREADING DEVICE FOR SPREADING VEHICLES

BACKGROUND OF THE INVENTION

1. Field of the Invention

The invention relates to a spreading device for spreading vehicles.

2. Description of the Related

Spreading devices or spreading apparatuses are sufficiently known to the person skilled in the art and are also designated as spreading machines. Such spreading devices are designed, for example, as winter road maintenance spreading devices, but may however also be used for other applications, for example, for discharging cleaning agents, fertilizers, or crop protection agents, or the like. The spreading devices of the listed type are either mounted as so-called set-top devices, attached on the cargo area of a support vehicle, or are fixed components or assemblies of a spreading vehicle, for example, a winter road maintenance vehicle. The winter road maintenance vehicle may, in particular, be a winter road maintenance vehicle for municipal clearing and spreading use, for example, a commercial vehicle.

The spreading in the scope of the winter road maintenance, and also the spreading of fertilizer or plant protection agents, may be carried out by discharging solid and/or liquid spreading agents or spreading materials, so that these types of spreading devices are designed, in particular, for discharging solid and/or liquid spreading agents to be spread. In particular in winter road maintenance, the discharge of solid spreading agents on road surfaces is carried out. e.g., via spreading agent reservoirs, which supply the solid spreading agents, in particular road salt, via a chute to a rotating spreading plate, from the edge of which the spreading material is scattered radially outward, namely spread. Due to the variable travel speeds of the support vehicles and scattering densities, and also depending on the state of the surfaces of the traffic zones, a uniform spread pattern remains difficult to achieve using only solid spreading agents.

Therefore, in recent times, solid spreading agents in winter road maintenance are overwhelmingly spread as so-called wet salt. In this wet salt spreading, the salt is wetted with a liquid during or directly prior to the spreading, so that the road salt and the liquid are jointly spread. The liquid is generally a salt solution, a so-called brine, which is added to the salt to be spread at the discharge device or on the way to the discharge device. The discharge device is generally a rotating spreading plate. The dry salt is, for example, sprayed in a conventional way with brine on the spreading plate or shortly before arriving at the spreading plate. In general, a so-called FS30 wet salt is thereby discharged, which has a brine content of 30% and a corresponding dry salt content of 70%.

The spread patterns achievable by spreading devices are dependent on, among other things, the wet salt used and are subject to certification and approval by the Federal Highway Research Institute (BAST). In particular, a certification for wet salt with 30° % brine proportion (FS30) exists for spreading devices mostly used in winter road maintenance. Upon increasing the brine proportion, the spread patterns and the spread locations correspondingly change when using generic spreading devices, so that an obtained certification will thereby lapse.

In practice, however, it has been shown that increasing the brine proportion and the simultaneous reduction of the dry salt influences the spread pattern quite favorably. In this way, an improved transverse distribution may be observed across the entire spreading width. Additionally, advantageously, a more rapid onset of the melting effect is observed when using a higher brine content, as dissolved salt generally leads to a faster thawing than dry salt. Therefore, there are efforts to increase the brine content in the spreading agent, or respectively to promote "liquid spreading", namely the application of purely liquid spreading agents.

For example, a spreading device is known from German Patent No. DE 20 2017 101 056 U1, with which wet salt and liquid spreading agents may be spread via a spreading plate, so that the discharged spreading material has a significantly higher brine proportion. Regardless of whether the applied brine is mixed in a wet salt or is used directly as brine, the discharge of the brine is carried out according to the spreading device of German Patent No. DE 20 2017 101 056 U1 via a spreading plate, by which means in particular the achievable casting distance is limited for a desired spread pattern, so that a need exists to increase the casting distance for liquid spreading agents while retaining an optimal spread pattern.

Furthermore, document Korean Patent No. KR 10 2004 0 018 671 A discloses a spreading device for discharging liquid and solid spreading agents. The device comprises a spreading plate for distributing the solid spreading agents and a nozzle assembly for distributing the liquid spreading agent. In the nozzle assembly, multiple nozzles are provided, extending substantially radially outward on a periphery of a cylindrical base body designed to rotate, through which nozzles the liquid spreading agent is sprayed during the rotation of the base body. The nozzles are adapted to the radius of the spreading plate with respect to their radial length, so that the solid and liquid spreading agents are mixed most efficiently during a spreading process and are discharged with approximately the same casting distance. It is disadvantageous in the spreading device of KR 10 2004 0 018 671 A that a fixed, predetermined, unchangeable casting distance is determined, and thus an accompanying unchangeable spread pattern.

SUMMARY OF THE INVENTION

It is an object of the present invention to provide a spreading device for spreading vehicles for discharging liquid spreading agents, which overcomes the disadvantages of the prior art and with which the discharge of liquid spreading agents at a large casting distance may be optimally adapted to the corresponding need and the spread pattern may be matched to predetermined conditions.

The present invention provides a spreading device for spreading vehicles for discharging spreading agents. The spreading device comprises at least one tank for receiving liquid spreading agents to be spread and comprising at least one rotationally-driven discharge device connected to the tank via a provided supply unit, wherein the discharge device comprises at least one base body and a cover which is securely connected to the base body. The base body thereby defines a receiving chamber for the supplied liquid spreading agent and is designed to be substantially cylindrical, wherein the base body has at least one bottom section which forms an underside of the discharge device and comprises an inlet opening, and at least one wall section which projects from the bottom section and concentrically surrounds a rotational axis. The discharge device comprises multiple discharge units, each of which has a discharge opening for dispensing the liquid spreading agent from the receiving chamber, wherein the discharge units are arranged in the area of the wall section of the base body and interact with the outlet openings additionally provided in the wall section. The spreading device is characterized in particular in that the discharge device is designed in such a way that the liquid spreading agent is dispensed outwards from the receiving chamber by the discharge units in a jet-like manner due to the centrifugal force produced during a rotation about the rotational axis, and in that the discharge units are designed to be variably adjustable, namely in such a way that a direction of the jet of the exiting liquid spreading agent may be adjusted at the discharge opening.

A liquid spreading agent is presently understood, for example, to be a salt solution suitable for winter road maintenance with a predetermined salt concentration, wherein the dissolved salts may primarily be sodium chloride (NaCl) but also calcium chloride ($CaCl_2$ or magnesium chloride ($MgCl_2$), and in particular may also be mixtures of the listed salts. A salt solution of this type is also designated as brine. For example, the brine may be a brine preferably used in winter road maintenance with a sodium chloride content of 22%. The liquid spreading agent may presently also be designated as liquid spreading material or as spreading brine. The discharge of liquid spreading agents may also be understood, corresponding to the present concept, as liquid scattering or brine scattering or as brine ejection or also as spinning off of the brine.

A liquid spreading agent may, however, according to the present concept, also be an arbitrary liquid, for example a liquid compound or solution or also merely water. Solids dissolved in water, liquid fertilizers or plant protection agents represent examples of a liquid compound or solution.

A purely liquid discharge, namely a discharge of liquid spreading agent, in particular brine, with a particularly large casting distance and with an adjustable dispersion pattern or scatter pattern may be carried out particularly advantageously using the present spreading device. The present spreading device thereby facilitates a comprehensive spread pattern or spray pattern, namely with a comprehensive, uniform spreading agent distribution up to the sensitive edge or outer areas. The distribution is thereby far less sensitive to wind, in comparison to conventional spraying systems, like known spray bars, so that the spreading agent may be safely and reliably discharged, in particular also in the outer spreading or spraying area, namely for example in the edge areas of a motorway, with a uniform, comprehensive, and thorough distribution. Due to this advantageously possible, comprehensive spread pattern or spray pattern, the regulations and requirements applicable in the area of winter road maintenance are also satisfied by the present spreading device. For example, using the present spreading device, the provisions prescribed in the DIN EN 15597-2:2010-02 standard, "Winter Maintenance Equipment—Spreading Machines—Part 2: General Requirements and Information for Spreading Machines", are maintained. The certification and approval by the Federal Highway Research Institute (BAST), mentioned at the outset, may therefore be obtained for the present spreading device specifically at a significantly higher brine proportion or in particular for pure liquid spreading.

The discharge device according to the invention comprises a base body, which forms a receiving chamber for the supplied liquid spreading agent, in particular for the supplied brine. This receiving chamber virtually represents a delimited supply or a reservoir for a predetermined amount of the spreading agent to be brought into movement, in particular for brine, wherein the liquid spreading agent may be continuously replenished into the receiving chamber from the tank by means of the supply unit. The liquid spreading agent located in the receiving chamber is finally set into motion due to the rotation of the base body. The base body may be understood as a drum-like base body, or as a drum-like, rotating base body, wherein the receiving chamber is formed by the inner space of the drum. The base body is thereby designed in the form of a cylinder, in particular in the shape of a right circular cylinder or a straight circular cylinder, with a circular floor area formed by the bottom section and a lateral surface formed by the wall section. However, it is also conceivable that the base body substantially has the shape of a cylindrical section. The base body is preferably manufactured from a highly wear-resistant plastic material.

To rotate the discharge device, it is operatively connected to a drive or motor. In addition, the cover, which forms an upper side of the discharge device, is securely connected both to the base body and also coupled to the drive. The cover may, for example, also simultaneously be a rotating part of the drive or of the motor itself, so that in such an embodiment, the base body is directly fixed or docked on the motor.

Due to the rotation of the discharge device, a corresponding centrifugal force or centrifugal power, which is dependent on the set rotational speed, acts on the liquid spreading agent, in particular the brine, which is supplied into the receiving chamber and located there, so that the brine is dispensed or spun off outwardly following the centrifugal force, namely directed radially outward starting from the axis of rotation, via the discharge units. The dispensing of the liquid spreading agent, in particular the brine, is thus carried out due to the liquid pressure generated in the receiving chamber of the rotating base body, depending on the amount of spreading agent present there and the rotational speed.

The liquid spreading agent or the brine is particularly advantageously bundled during the dispensing out of the discharge units, namely upon exiting the discharge units, so that the liquid spreading agent leaves the discharge device in a jet-like manner in a dispensing jet, by which means an undesired or interfering atomization or a formation of superfine droplets or an aerosol formation is effectively counteracted. The jet of liquid spreading agent exiting the discharge opening, namely the dispensing jet, thereby has at the discharge opening, namely directly upon exiting the discharge opening directly at the outlet or at the outlet opening, a direction corresponding to the adjustment of the discharge units. This direction may be understood as the discharge direction or direct discharge direction of the jet and may be changed or aligned by the variable adjustment of the discharge units.

Due to the jet-like output of the spreading agent, in particular due to the output in the form of a jet of brine droplets, preferably of large brine droplets, losses due to wind and turbulences may be minimized in comparison to the superfine brine droplets as they are dispensed in conventional spraying systems or devices. In addition, the uniform, comprehensive discharge up to the edge area of the spread pattern and thus up to the side of the road is achieved due to the large brine droplets, by which means an unobstructed traffic flow is supported. The discharge height or the spreading height may thereby also be correspondingly selected, so that the traffic moving on the roadways is much less impaired. An adjustment of the spread pattern to the width of the roadway to be treated may also be carried out due to the adjustability of the discharge units.

Particular advantages arise when the discharge units additionally have attachable or integratable or integrated nozzle elements or outlet nozzles, which may be arranged, for example, in the area of the outlet opening or outlet aperture of the discharge units. Due to such nozzle elements, integrated or incorporated into the flow path or arranged adjoining to the outlet aperture, the flow path or also a jet shape and/or the discharge speed of the discharging liquid spreading agent for example, may additionally be influenced. Thus, different outlet nozzles with different nozzle properties may be used, wherein, for example, a jet diameter or a discharge pressure or the discharge speed of the discharging liquid spreading agent may be varied depending on the nozzle properties. This type of additional, attachable or integratable or integrated nozzle elements or outlet nozzles may also be understood as insertion nozzles or push-in nozzles or also as mini nozzles.

As previously mentioned above, by adjusting the variably adjustable discharge units, the direction of the dispensing jet may be influenced or manipulated at the outlet opening of the discharge units, namely directly at the discharge opening. Expressed in other words, the jet of the discharging liquid spreading agent may be oriented or directed immediately at the outlet from the discharge device in a desired way. After a successful, desired adjustment, a fixing of the discharge units in a selected, optimal direction or adjustment may also be carried out. For example, the direction of the discharging liquid spreading agent deviates from the radial orientation and the spreading agent is emitted in a predetermined angle relative to the radial direction. In order to achieve particularly high casting distances, the discharge units may advantageously be adjusted, in particular so that the respective discharge openings face in a direction counter to the rotational direction of the base body, so that the dispensing jet immediately at the outlet point from the discharge opening has a direction oriented counter to the rotational direction.

Casting distance and scatter pattern are particularly adjustable, in that on the one hand the rotational speed of the discharge device and on the other hand the adjustment of the discharge units may be variably selected and coordinated with one another. For example, the rotational speed may be adjusted so that the discharge device rotates with a rotational speed in a range from 10 to 500 revolutions per minute, preferably in a range from 50 to 400 revolutions per minute, particularly preferably in a range from 150 to 350 revolutions per minute. At a correspondingly adjusted rotational speed and at a suitable adjustment of the discharge units, advantageous casting distances of more than 10 m, in particular casting distances of up to 13 m, are achievable. The distribution of the liquid spreading agent and the casting distance may also be optimally influenced, in particular using the previously mentioned outlet nozzles or integrated nozzle elements.

A particularly uniform spread pattern and a uniform distribution of the spreading agent may thereby be achieved in that the variably adjustable discharge units are preferably arranged uniformly distributed across the periphery of the wall section and spaced apart from one another. The number of discharge units distributed across the periphery of the base body may be different, depending on the diameter of the base body, and may lie, for example, in a range from five to twelve discharge units per base body, preferably between six and ten discharge units per base body, particular preferably at eight discharge units per base body.

According to one preferred embodiment of the invention, each discharge unit is adjustable in at least one vertical direction in such a way that a free end of the discharge unit, which carries the discharge opening, may be deflected in the vertical direction. Alternatively, or additionally, each discharge unit is adjustable in at least one horizontal direction in such a way that a free end of the discharge unit, which carries the discharge opening, may be deflected in the horizontal direction. In the case of a preferred deflection of the free end supporting the discharge opening upward in the vertical direction, the spreading agent exits the discharge opening in a corresponding discharge direction, which deviates from a horizontal orientation and is directly slightly obliquely upward. For example, the discharge direction of the exiting spreading agent at such an upward facing adjustment of the discharge units defines an acute angle with a horizontal plane extending parallel to the bottom section of the base body. If the free end carrying the discharge opening is deflected in a horizontal direction, the discharge opening may be pivoted in such a way that the discharge direction of the exiting spreading agent deviates from a radial orientation, and, for example defines an acute angle with a vertical plane accommodating the axis of rotation. Each discharge unit has one main axis, wherein the discharge units are preferably rotatable about the respective main axes for variable adjustment.

For example, in order to achieve a particularly large casting distance for the spreading agent, the free ends of the discharge units are deflected upward in the vertical direction and pivoted in the horizontal direction counter to the rotational direction of the discharge device, so that the discharge openings face obliquely upward and simultaneously counter to the direction of rotation in this preferred position. A substantially crescent shaped pattern or a crescent-shaped progression results therefrom for the jets of spreading agent exiting from the discharge openings, by which means the spread pattern is adjustable to an ideal shape and the casting distance may be significantly increased.

According to one advantageous embodiment variant, each discharge unit is designed from multiple parts and comprises at least one base piece designed for fixing to the wall section of the base body and one head piece, which is articulately connected to the base part and comprises the discharge opening. Very specific advantages result therefrom, in that the head piece has a ball joint section and the base piece forms a joint socket type receptacle for the ball joint section. With this type of ball joint type connection between the head piece and the base piece, the head piece is advantageously pivotable in any direction relative to the base piece.

Each discharge unit has one main axis and is advantageously fixed on the wall section of the base body in such a way that each main axis is arranged in a radial orientation with respect to the axis of rotation. According to particularly preferred embodiment variants, the discharge units may also be designed in such a way that they extend along their respective main axis past the periphery of the base body in such a way that the discharge openings are arranged at a predetermined distance to the wall sections of the base body. For example, the discharge units may each have a tubular piece or a tubular section which virtually forms an extension of the discharge unit in the direction of the main axis. It may thus be additionally achieved, e.g., that the discharge openings are arranged on a larger circle, extending concentric to the wall section of the base body, and thus form a circle surrounding the base body at a defined spacing like a ring.

In particular in the case of discharge units designed from multiple parts, embodiments are conceivable in which the extending tubular piece or the tubular section is arranged between the joint ball sections and the discharge opening. Alternatively, a tubular piece of this type may, however, also be arranged in connection to the discharge opening, if the tubular section itself has a correspondingly equivalent discharge opening. The extending tubular piece may be a separate element connectable to the head piece or may be designed as a section of the head piece. An extending tubular piece of this type may for optimal alignment of the discharge opening also be designed as a curved tubular piece. According to the concept of the present invention, this type of tubular piece is also to be understood as a discharge tube.

In particular in the case of embodiments, which go without an articulated connection between the head and base piece of a discharge unit formed by at least two parts, the tubular piece or discharge tube may be formed particularly preferably as an angled tubular piece, namely as an angled tube with a first tube section extending along the main axis and a second tube section extending along a discharge axis. The discharge opening is thereby arranged on a free end of the second tubular piece extending along the discharge axis. The angled tube is preferably designed so that the tube sections oriented at an angle to one another define a predetermined angle, wherein the first and the second tube sections define, for example, an angle in a range from 115° to 160°, preferably in a range from 120° to 155°, preferably in a range from 125° to 150°, particularly preferably in a range from 130° to 145° and more particularly preferably an angle of approximately 135° or approximately 1400. Expressed in other words, the second tube section is angled relative to the first tube section in such a way that the discharge axis and the main axis intersect at an angle in the range from 20° to 65°, preferably in the range from 25° to 60°, preferably in the range from 30° to 55°, particularly preferably in the range from 35° to 50°, and particularly preferably at an angle of approximately 40° or approximately 45°.

According to the present concept, the direction of the jet of the liquid spreading agent exiting the discharge opening, namely of the dispensing jet, immediately at the outlet opening or the discharge opening corresponds to the orientation of the discharge axis.

In the described embodiment of the discharge units, which have an angled tube as the discharge tube, each discharge unit is adjusted virtually to a certain angle, so that the dispensing jet of the liquid spreading agent exits immediately at the discharge opening at the adjusted angle of the same. More particularly preferably, the discharge tubes designed as angled are thereby arranged on the wall section of the base body of the discharge device so that the free end, carrying the discharge opening, of the second tube section extending along the discharge axis faces counter to the rotational direction of the base body. High casting distances or spraying distances may be achieved thereby in a particularly advantageous way at a simultaneously particularly uniform spread pattern. In order to support this even more, the discharge tubes may be rotated about the main axis for variable adjustment of the discharge units, so that the free ends of the discharge tubes, which carry the discharge openings, are additionally deflected upward in the vertical direction. The discharge openings face obliquely upward and simultaneously counter to the rotational direction in this preferred position. A crescent shaped pattern or a crescent shaped progression for the jets of the spreading agent exiting from the discharge openings thereby results, by which means the spread pattern is adjustable to an ideal shape and the casting distance may be significantly increased. The scattering height may thereby be optimally adjusted.

According to one particularly preferred embodiment of the invention, a reservoir is additionally provided for receiving solid spreading agents to be spread and at least one supply and feeding unit is provided for applying the solid spreading agent on the upper side of the discharge device, wherein the spreading device is set up for simultaneous discharge of liquid and solid spreading agents.

In particular, the cover of the discharge device is thereby designed in the form of a spreading plate for simultaneous discharge of liquid and solid spreading agents, wherein the spreading plate particularly preferably has a plate radius that is greater than a base body radius of the base body. Guide walls projecting upward may be provided on this type of spreading plate, particularly preferably on an upper side facing away from the base body.

In the discharge device, a cover screen may additionally be provided arranged in the receiving chamber of the base body, wherein the cover screen is designed for shielding at least one of the outlet openings in the wall section on the inner side. The cover screen particularly preferably thereby comprises a screening surface area designed as curved, wherein the curvature of the screening surface area is particularly preferably adapted to a curvature of the wall section in such a way that the screening surface area may be arranged in contact or practically in contact with an inner side of the wall section. A height of the screening surface area and a peripheral length of the screening surface area are particularly preferably selected such that the screening surface area is adapted to the wall section and completely covers or may cover at least one outlet opening. However, particular advantages arise if the height and peripheral length of the screening surface area are selected so that multiple outlet openings are simultaneously completely covered or may be covered.

The cover screen is preferably stationarily arranged and fixed in a predetermined position in the receiving chamber in such a way that the cover screen is decoupled from the rotation of the base body and does not rotate with the same. The wall section of the base body thus slides past the cover screen. Particular advantages result if the position of the cover screen is adjustable in a controlled way. For example, the position may be adjusted using a provided plate controller of the spreading plate.

To ensure a most unobstructed sliding past one another of the cover screen and the inner side of the wall section of the base body, the cover screen is produced from a material with low coefficients of friction, wherein the material is simultaneously subjected to low wear and is highly wear resistant. The cover screen is preferably manufactured from Teflon®.

Since the cover screen is arranged to be stationary, independent of the rotation of the base body, respectively alternating output opening(s) is/are covered depending on the turning or rotation of the base body, so that it is to be understood according to the present invention that the outlet opening(s) are respectively covered as they "move past" the corresponding peripheral position or rotational position.

The cover screen provides the particular advantage that the spread pattern for the discharged spreading agent or the spreading agent to be discharged may be varied due to corresponding positioning or adjustment, namely in particular in such a way that no spreading agent is cast in the direction of the rear of the vehicle. For example, a certain angular range, preferably of approximately 10° to 20°, may be "omitted", in which no casting of spreading agent takes place. The vehicle is thus particularly advantageously protected thereby, and a conventional spray protection device, provided for spreading vehicles, may be omitted.

Such conventional spray protection devices, which are usually formed by plastic or rubber flaps hanging vertically downward from the rear of the vehicle, have the considerable disadvantage that spreading agent, which impacts there, initially collects, and, upon reaching a certain mass, slides down toward the roadway in an uncontrolled manner. These clusters of spreading material impacting the roadway at irregular distances are thus "lost" to the spread pattern. The cover screen according to the preferred embodiment of the invention thus provides the additional advantage that spreading agent may be saved, as the entire amount of discharged spreading agent is available for the spread pattern to be generated on the roadway.

According to one particularly preferred embodiment of the present spreading device, two or more discharge devices are provided. For example, the two or more discharge devices may be arranged next to one another so that the respective axes of rotation of the discharge devices extend parallel to one another. The discharge devices may be arranged at approximately the same height, with respect to a height level, so that, for example, the respective bottom sections of the base bodies are received in a mutual plane extending horizontally, or they may be arranged at different height levels, so that the respective bottom sections of the base bodies are received in horizontal planes extending parallel to one another.

Alternatively, the two or more discharge devices may also be arranged one above the other in such a way that the respective bottom sections of the base bodies are received in horizontal planes extending parallel to one another, and the axes of rotation of the respective discharge devices respectively coincide into one mutual axis of rotation. In this preferred arrangement, the discharge devices are aligned flush with one another with respect to a vertical orientation.

These preferred embodiments with two or more adjacently arranged discharge devices achieve particularly advantageously extreme casting distances. For example, spreading vehicles with such an embodiment variant may be used for airports or other large surfaces, wherein a discharge device is respectively arranged on the rear of the spreading vehicle or winter road maintenance vehicle, namely projecting past the side of the spreading vehicle on the right and left sides, so that approximately twice the scattering distance or casting distance may be achieved. The discharge devices are, for example, mounted on suitable brackets provided for this purpose.

It is also advantageously possible, by using two or more discharge devices, to cover a very large range of the amount of spreading agent, from low to high. For example, discharge devices arranged above one another may be combined into systems that may be switched alternatingly with respectively small and large throughputs. The discharge devices may thereby be operated separately from one another or in combination.

The present invention also comprises a discharge device for a spreading device for a spreading vehicle for discharging spreading agents. The discharge device has at least one base body and a cover securely connected to the base body, wherein the base body defines a receiving chamber for supplied liquid spreading agent and is designed substantially in the shape of a cylinder, wherein the base body has at least one bottom section forming an underside of the discharge device with an outlet opening and at least one wall section projecting from the bottom section and concentrically surrounding an axis of rotation, wherein the rotationally-drivable discharge device comprises multiple discharge units with a respective discharge opening for dispensing the liquid spreading agent from the receiving chamber. The discharge units are arranged in the area of the wall section of the base body and interact with outlet openings provided in the wall section. The discharge device is characterized in particular in that it is designed in such a way that the liquid spreading agent is dispensed outwards from the receiving chamber through the discharge units in a jet-like manner due to the centrifugal force produced during a rotation about the axis of rotation, and in that the discharge units are designed to be variably adjustable in such a way that a direction of the jet of liquid spreading agent at the discharge opening may be adjusted.

Refinements, advantages, and potential applications of the invention arise from the subsequent description of exemplary embodiments and from the figures. All described and/or graphically depicted features are thereby in principle the subject matter of the invention, in themselves or in any combination, regardless of their summarization in the claims or their dependence.

BRIEF DESCRIPTION OF THE DRAWINGS

The invention will subsequently be described in greater detail by way of exemplary embodiments in conjunction with the drawings. As shown in.

DETAILED DESCRIPTION OF THE PREFERRED EMBODIMENTS

Figure 1A:
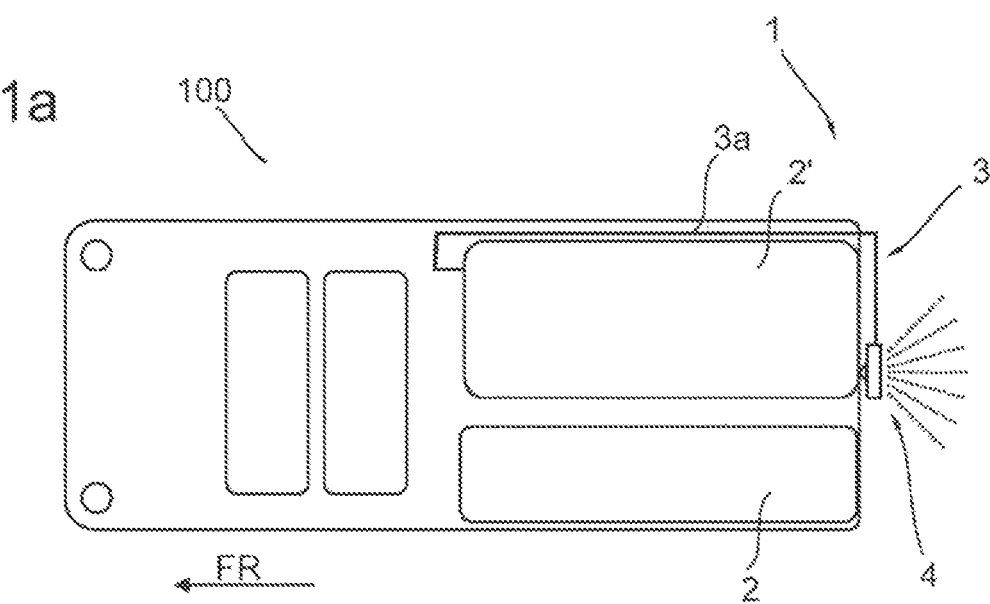
FIG. 1a a top view from above of a winter road maintenance vehicle with a mounted spreading device according to one embodiment of the present invention.
Figure 1B:
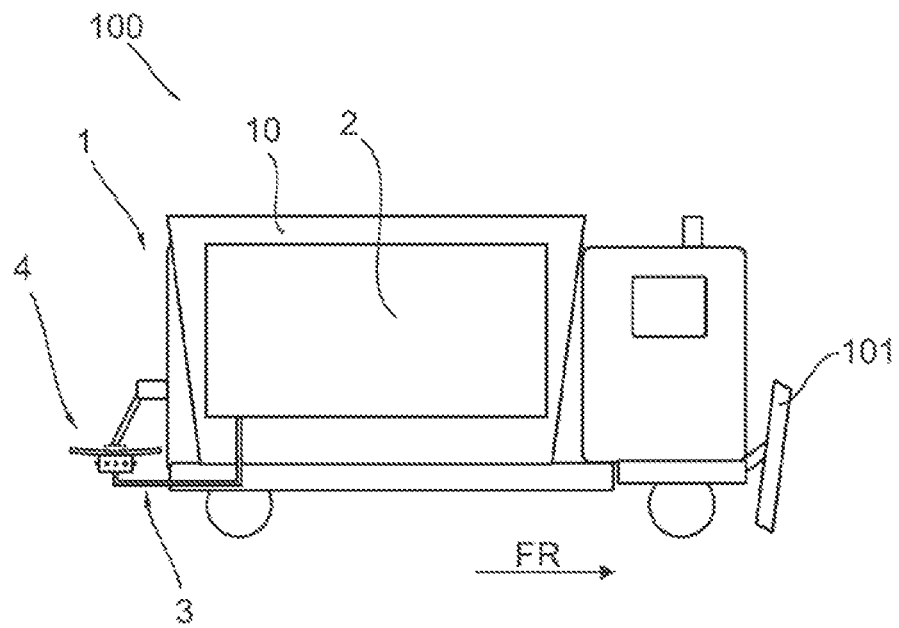
FIG. 1b a winter road maintenance vehicle in a side view with a mounted spreading device according to one embodiment of the present invention.

A winter road maintenance vehicle 100 with in each case an exemplary embodiment variant of a spreading device 1 according to the invention for spreading agents is depicted in FIGS. 1a and 1b respectively, wherein spreading device 1 is designed in particular to be set up on a conventional support vehicle. Winter road maintenance vehicle 100 of FIG. 1a is depicted in a top view and that of FIG. 1b in a side view.

The structure of these types of winter road maintenance vehicles 100 is sufficiently known from the prior art. For example, winter road maintenance vehicle 100 may be designed as a conventional commercial vehicle, and in particular comprise a loading or carrying surface and a cab. A snowplow 101, which is designed for example on the front as a front snowplow or on the side as a side snowplow, may additionally be provided on winter road maintenance vehicle 100. In the example depicted in FIG. 1b, a front snowplow 101 is arranged on the front side, which may remove snow, lying in front of winter road maintenance vehicle 100, from the roadway during movement of winter road maintenance vehicle 100 in the travel direction FR.

Spreading device 1 in the example depicted in FIG. 1a is designed for discharging liquid spreading agents and, in the example, depicted in FIG. 1b is designed for simultaneously discharging solid and liquid spreading agents.

In each case, spreading device 1 comprises at least one tank 2, 2' for receiving liquid spreading agents to be spread and at least one rotationally driven discharge device 4 connected to tank 2, 2' via an additionally supplied supply unit 3. Tank 2, 2', which in the present example forms a brine tank and is also designated as a brine tank, is mounted on a support frame forming a support surface of winter road maintenance vehicle 100. Discharge device 4 is arranged on the rear side, i.e., at the back on winter road maintenance vehicle 100 with respect to the travel direction FR.

Supply unit 3 functions to supply or guide brine from brine tank 2, 2' into discharge device 4 arranged on the rear side and has for this purpose a supply line 3a, via which brine tank 2, 2' is connected to discharge device 4 in a leakproof way.

In the case of winter road maintenance vehicle 100 depicted in FIG. 1b, spreading device 1 additionally comprises a reservoir 10 for receiving solid spreading agents to be spread and at least one conveying and loading unit, not depicted, for transporting the solid spreading agent from reservoir 10 to discharge device 4 and for applying the solid spreading agent onto discharge device 4.

While not depicted in the figures, it is however possible, that spreading device 1 has two or more discharge devices 4. These may be mounted next to or over one another on winter road maintenance vehicle 100. For example, in use at airports, an arrangement of two discharge devices 4 mounted next to one another on the rear side of winter road maintenance vehicle 100 has proven particularly beneficial, as a larger, namely approximately double the casting distance may be achieved by this means. Discharge devices 4 may be mounted, for example, on brackets provided for this in order to project by a predetermined amount past the vehicle side on the left and right side of winter road maintenance vehicle 100.

Figure 2:
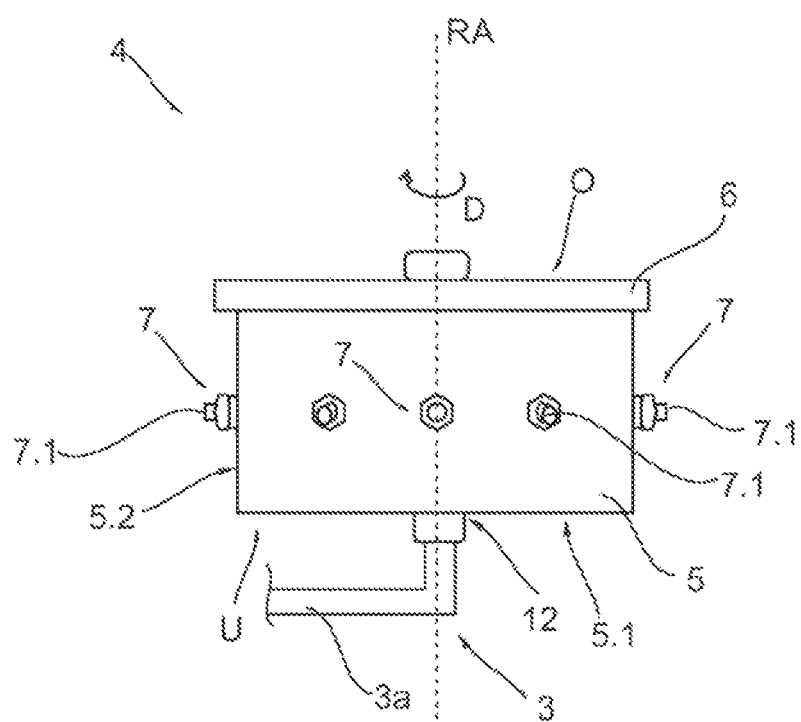
FIG. 2 a schematic side view of one embodiment of a discharge device.

One exemplary embodiment of a discharge device 4 is schematically depicted in FIG. 2 in a side view, wherein exemplary discharge device 4 is designed for discharging liquid spreading agent to be spread, in particular brine. Discharge device 4 is rotationally driven about an axis of rotation RA and comprises a base body 5 and a cover 6 securely connected to base body 5.

Drum-like base-body 5, designed substantially in the shape of a cylinder or also a cylinder section, has a bottom section 5.1 forming an underside U of discharge device 4, and a wall section 5.2 projecting from bottom section 5.1 and concentrically surrounding axis of rotation RA. Base body 5 thereby defines a receiving chamber AR, formed in the interior of the base body and delimited by bottom section 5.1 and wall section 5.2 (see FIGS. 4 and 5) for the supplied liquid spreading agent. The supply of the liquid spreading agent into receiving chamber AR is carried out via supply unit 3 from below on discharge device 4, wherein bottom section 5.1 of base body 5 has an inlet opening 12 (not visible in FIG. 2, see FIG. 4) connected to supply line 3a.

Cover 6 forms an upper side O of discharge device 4, wherein base body 5 is securely connected to cover 6 using suitable fixing means. Cover 6 in turn is operatively connected to a drive, not shown, which sets cover 6 into rotation about axis of rotation RA. Due to the fixing of base body 5 on cover 6, base body 5 rotates together with cover 6 at the same rotational speed and rotational direction D predetermined by the drive. Cover 5 may simultaneously be a rotating part of the drive or a motor, so that in such an embodiment variant, base body 5 is fixed or docked directly to the motor.

Discharge device 4 is equipped with multiple, variably adjustable discharge units 7 for dispensing the liquid spreading agent from receiving chamber AR, wherein variably adjustable discharge units 7 are arranged in the area of wall section 5.2 and are uniformly distributed across a periphery of wall section 5.2 spaced apart from one another. Each discharge unit 7 thereby interacts respectively with an outlet opening 13 (not visible in FIG. 2, see FIGS. 4 and 5) provided in wall section 5.2 of base body 5. Each discharge unit 7 comprises a discharge opening 7.1 on its free end side. Due to the rotation of discharge device 4 about axis of rotation RA, the liquid spreading agent supplied into receiving chamber AR and maintained there is dispensed outwardly out of receiving chamber AR through discharge units 7 based on the generated centrifugal force. The liquid spreading agent thereby exits out of discharge units 7 through the respective discharge openings 7.1 in a jet-like, bundled way, wherein an undesired, interfering nebulization of the liquid spreading agent, or the formation of superfine droplets is effectively prevented.

Depending on the rotational speed of discharge device 4, the casting distance may be adjusted as needed. For example, the rotational speed for the optimal discharge of the brine may have a value for a revolution count in a range from approximately 10 to 500 revolutions per minute. Depending on the revolution count, particularly advantageous casting distances of up to 13 meters may thus be achieved, and simultaneously a nebulization or aerosol formation through fine spraying is effectively prevented.

Figure 3:
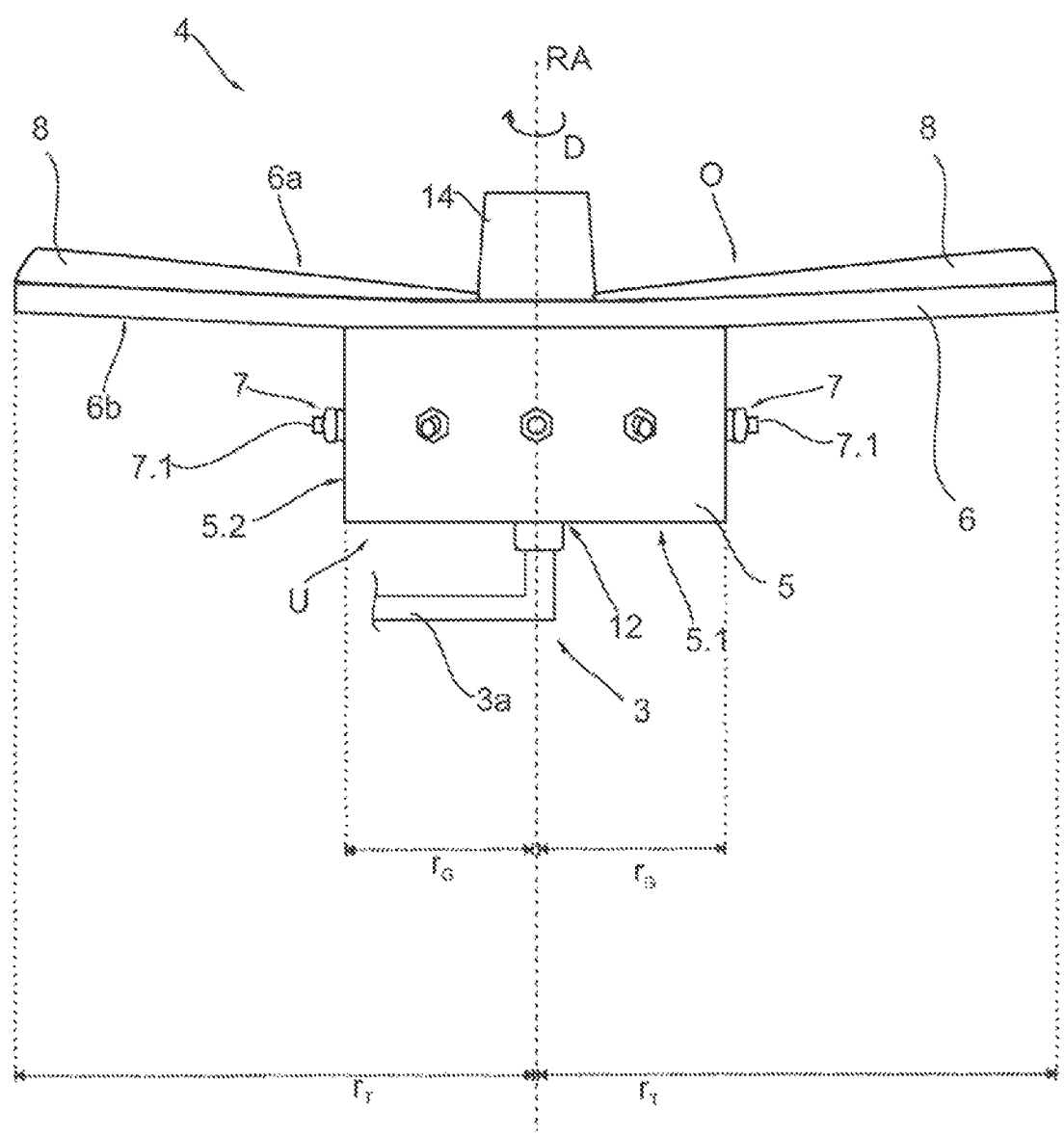
FIG. 3 a schematic side view of another embodiment of a discharge device.

Another exemplary embodiment of a discharge device 4 is depicted in FIG. 3, which is designed for the simultaneous discharge of solid and liquid spreading agents to be spread. Discharge device 4 according to FIG. 3 differs from the embodiment variant depicted in FIG. 2 mainly in that cover 6 is designed in the form of a spreading plate. Spreading plate 6 is thereby operatively coupled to a drive, again not depicted, which sets spreading plate 6 into rotation about axis of rotation RA. Base body 5 is fixed on an underside 6b of spreading plate 6 and rotates, together with spreading plate 6, about axis of rotation RA.

Spreading plate 6 is designed in a known way and is designed in particular for discharging solid spreading agents, in particular for discharging wet salt. Spreading plate 6 has for this purpose a plate radius $r_T$ which is greater than a base body radius $r_G$ of base body 5. On its upper side 6a facing away from base body 5, spreading plate 6 is equipped with guide walls 8 projecting upward, which are designed in the form of throwing blades and arranged in the radial direction in such a way that they laterally delimit respective guide channels, shaped like pie wedges and arranged between guide walls 8, for the spreading agent.

The solid spreading agent, in particular road salt, is applied via a conveying and loading unit (not depicted in the figures) onto upper side 6*a* of the spreading plate, wherein the conveying and loading unit may comprise a chute which is designed so that the solid spreading agent, in particular road salt, impacts upper side 6*a* in the center of spreading plate 6. An impact dome 14 may be arranged in the center of spreading plate 6, which collects the road salt impacting downward from the chute and directs it radially outward through the guide channels. The solid spreading agent may additionally be wetted with brine or additional brine may be added to the solid spreading agent on spreading plate 6. For this purpose, for example, a brine line, not depicted in the figures, may be guided to upper side 6*a* of spreading plate 6, branching off of supply line 3*a* of supply unit 3, said brine line may additionally be connected to a spray assembly. A brine spray jet may be directed in the direction at the road salt exiting the chute by the brine line or the spray assembly connected thereto, the brine spray jet may additionally wet the road salt during the free fall or already at the center of spreading plate 6. The spray assembly may thereby be arranged stationarily or adjustably.

Analogous to the embodiment variant according to FIG. 2, base body 5 also rotates in the embodiment depicted in FIG. 3 due to its fixing on spreading plate 6 together with the same at the same rotational speed and rotational direction D predetermined by the drive. Due to the rotation, both the solid spreading agent, e.g., the wet salt, and also the liquid spreading agent, for example the brine, are thereby simultaneously discharged. Depending on the revolution count, particularly advantageous casting distances of up to 13 meters may thus be achieved both for the solid spreading agent and also for the brine, and simultaneously a nebulization or aerosol formation through fine spraying is effectively prevented.

Figure 4:
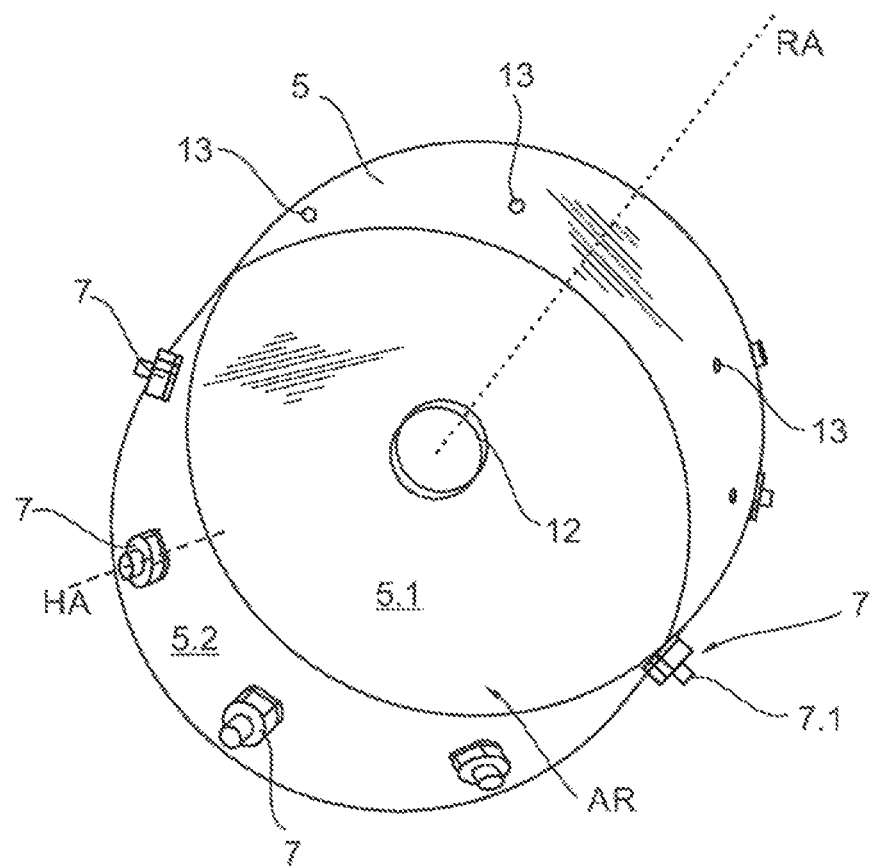
FIG. 4 one embodiment of a base body with discharge units fixed thereon schematically depicted in a perspective view.
Figure 5:
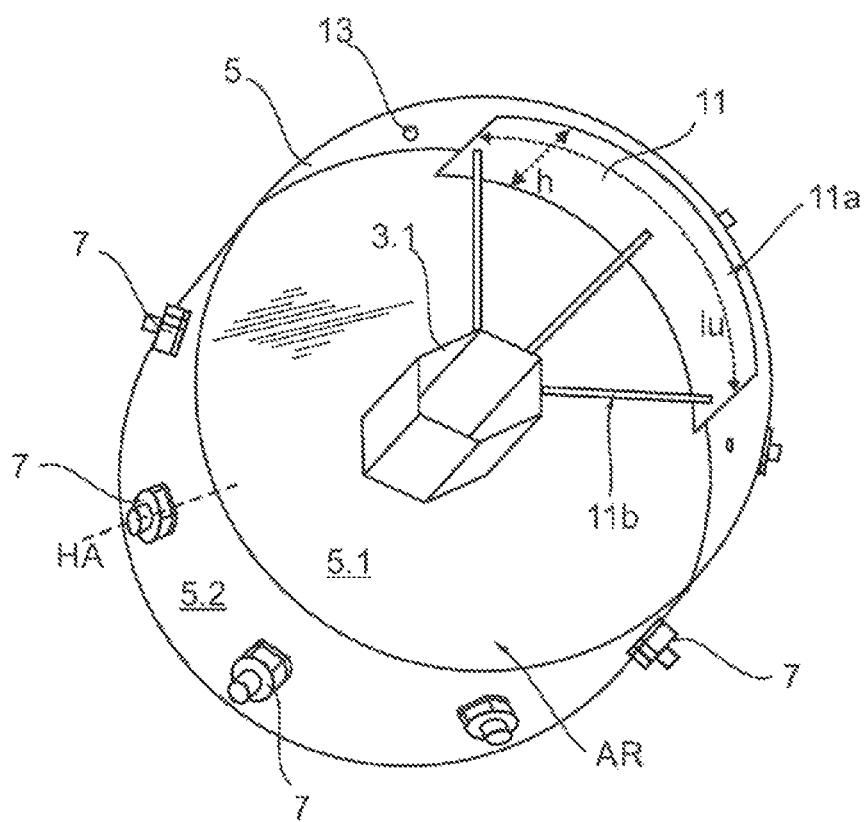
FIG. 5 the base body from FIG. 4 with additional cover screen in the receiving chamber schematically depicted in a perspective view.

An embodiment of a base body 5 with discharge units 7 fixed thereon is schematically depicted in FIGS. 4 and 5 respectively in a perspective view, wherein base body 5 is shown in FIG. 5 with a cover screen 11 additionally arranged in receiving chamber AR. Base body 5, designed in the shape of a cylinder, has a circular cross section and is designed as open on the upper side, namely on its end facing away from bottom section 5.1 and provided for fixing to cover 6 or on the spreading plate. An inlet opening 12, to which supply unit 3 is connected for supplying the brine in a leakproof way to base body 5, is centrally arranged in the center of bottom section 5.1.

Supply unit 3 is preferably coupled to inlet opening 12 of base body 5 in such a way that a supply end piece or a supply connecting piece 3.1, arranged coaxial to axis of rotation IRA, projects in a stationary way into receiving chamber AR, wherein inlet opening 12 in bottom section 5.1 of base body 5 and supply connecting piece 3.1 are coupled in such a way that base body 5 may rotate about stationary supply connecting piece 3.1.

Wall section 5.2, which substantially forms a lateral surface of cylindrical base body 5, extends projecting from bottom section 5.1 and connecting directly to bottom section 5.1. Multiple discharge outlet openings 13 are provided in wall section 5.2, uniformly distributed and spaced apart from one another across a periphery of base body 5, each discharge outlet opening 13 interacting with respectively one discharge unit 7 fixed to base boxy 5. Discharge units 7 are connected to base body 5 in such a way that a respective main axis HA of each discharge unit 7 is radially oriented with respect to axis of rotation RA.

To cover or screen individual outlet openings 13, an adjustable, in particular controllable, cover screen 11 may be provided, as depicted in FIG. 5. Cover screen 11 thereby comprises a protective shield-like screening surface area 11*a*, designed as curved, wherein screening surface area 11*a* is adapted with respect to its geometry to wall section 5.2 and is, in particular, designed to arrive at abutting or virtually abutting contact on the inner side on wall section 5.2. A height h and a peripheral length lu of screening surface area 11*a* is thereby respectively at least large enough that screening surface area 11*a* may completely cover or close or shield at least one outlet opening 13 in wall section 5.2. Height h of screening surface area 11*a* preferably corresponds to at least half the height of wall section 5.2 of base body 5, height h of screening surface area 11*a* is particularly preferably at least two-thirds or at least three-fourths of the height of wall section 5.2. Peripheral length lu of screening surface area 11*a* is preferably selected so that at least two or at least three outlet openings 13 in wall section 5.2 may be simultaneously completely covered or closed or shielded.

Cover screen 11 is fixed on supply connecting piece 3.1 by means of struts 11*b*, and therefore does not rotate with base body 5, but instead rests in a previously adjusted, stationary position even during the rotation of base body 5 about axis of rotation RA. Struts 11*b* may be spring mounted against supply connecting piece 3.1 so that screening surface area 11*a* is pressed with a predetermined force against an inner side of wall section 5.2, wherein it must be taken into account that wall section 5.2 and screening surface area 11*a* may slide past one another unimpeded.

Since cover screen 11 is arranged stationary, independent of the rotation of base body 5, alternating outlet opening(s) 13 is/are respectively covered depending on the rotation of the base body, wherein it is to be understood that outlet opening(s) 13 are respectively covered as they "move past" the corresponding peripheral position or rotational position.

Cover screen 11 is adjustable, in particular designed to be controllable, namely in such a way that a position of screening surface area 11*a* is changeable or adjustable. The spread pattern for the spreading agent to be discharged or spread may be varied by corresponding positioning or adjustment of cover screen 11. In particular, cover screen 11 is thereby preferably arranged so that it is arranged in travel direction FR of winter road maintenance vehicle 100 (compare FIGS. 1*a*, 1*b*) in front of axis of rotation RA of discharge unit 4 and thus faces a rear of a vehicle. In this way, the spread pattern is adjusted so that no spreading agent is cast out in the direction of the rear of the vehicle despite the uniform distribution or arrangement of discharge units 7 about the entire periphery of cylindrical base body 5. For example, the spread pattern thereby corresponds substantially to a dispersion circle, in which one area, similar to a pie wedge is left out, in which no discharge of spreading agent is carried out, wherein this left out pie wedge area faces winter road maintenance vehicle 100.

The adjustment or displacement of cover screen 11 may preferably be carried out via a controller, not depicted in the figures. In one embodiment variant according to FIG. 3, in which the base body is fixed on the underside on spreading plate 6, cover screen 11 may be displaced, for example, using a plate controller.

Figure 6:
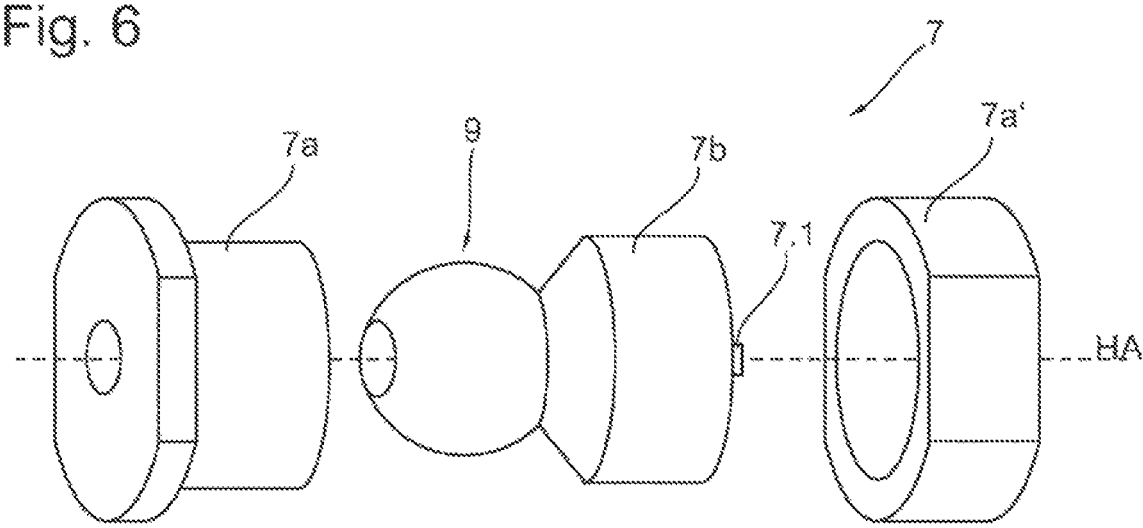
FIG. 6 an exploded drawing of one embodiment of a discharge unit of a discharge device in a roughly schematic side view.
Figure 7:
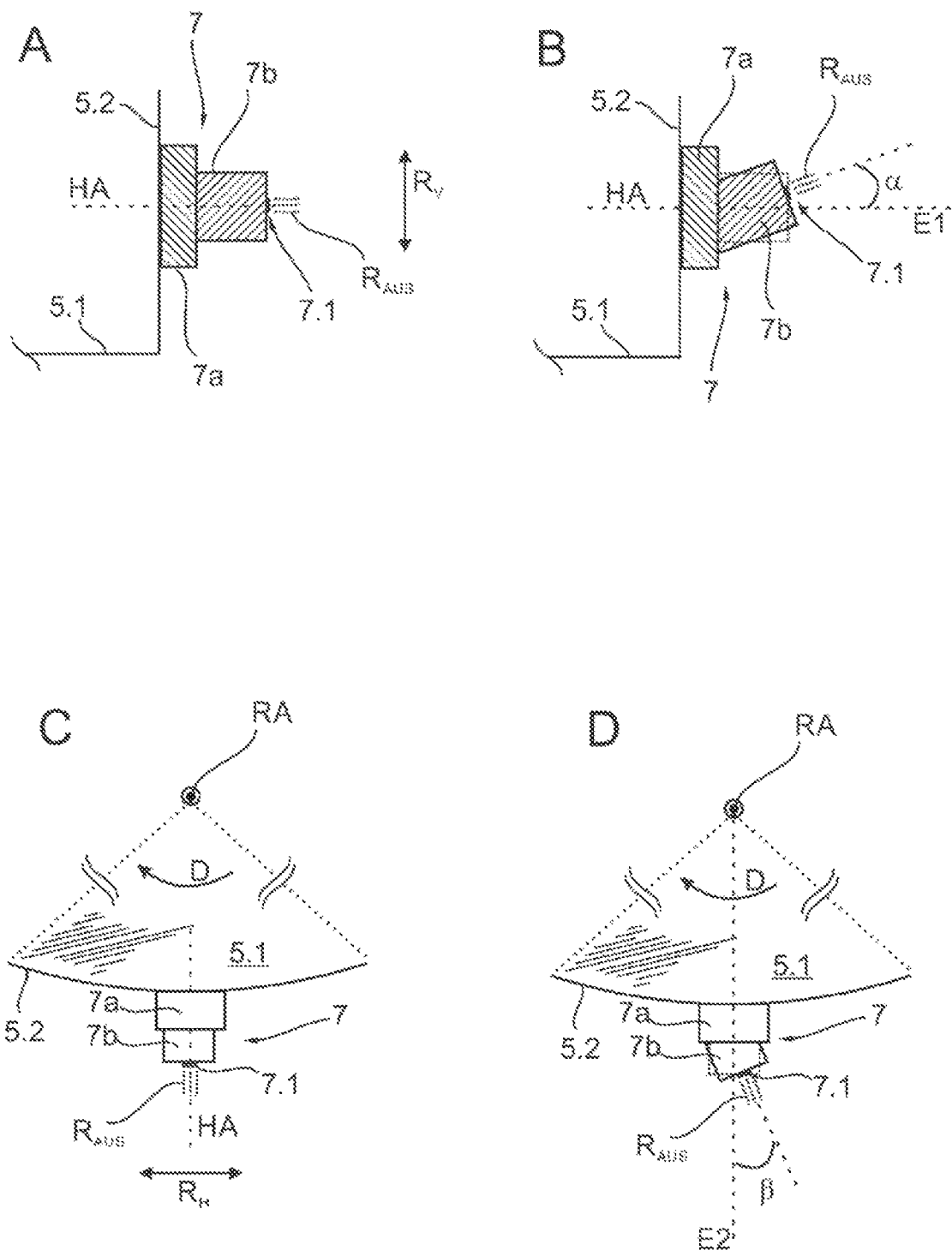
FIGS. 7 A and B show a vertical cross section of a mounted discharge unit schematically depicted in different adjustment positions; and C and D show a top view from above of a cross section of the base body with the fixed discharge unit in different adjustment positions.

The variable adjustability of discharge units 7 according to one preferred embodiment variant is illustrated in FIGS. 6 and 7. One preferred, exemplary embodiment variant of an adjustable discharge unit 7 of this type is shown in an exploded depiction in FIG. 6. Depicted discharge unit 7 is designed from multiple parts and comprises a base piece 7a, for fixing to wall section 5.2 of base body 5, which base piece is further provided with a sleeve-like fixing ring 7a', and a head piece 7b, articulately connected to base piece 7a, which comprises a ball joint section 9 and discharge opening 7.1. In the connected state or in the use position, head piece 7b with ball joint section 9 is accommodated in base piece 7a forming a joint socket in such a way that discharge opening 7.1 faces away from head piece 7b and forms a free end of discharge unit 7. By accommodating ball joint section 9 of head piece 7b in base piece 7a, a ball joint connection is formed which enables an adjustment in any direction, as demonstrated in more detail in FIG. 7.

In an initial position of discharge unit 7, head piece 7b, accommodated with its ball joint section 9 in base piece 7a, is aligned so that discharge opening 7.1 is likewise arranged along main axis HA and thus a discharge direction $R_{AUS}$ of the exiting spreading agent is oriented in the direction of main axis HA. This type of initial position is represented in FIG. 7 in parts A and C, wherein FIG. 7A shows discharge unit 7 in a vertical cross section in the direction of axis of rotation RA and FIG. 7C represents a cross sectional view of base body 7 in a top view from above.

Due to the ball joint-like connection of head piece 7b to base piece 7a, head piece 7b of discharge unit 7 may be deflected both in a vertical direction $R_V$ and also in a horizontal direction $R_H$. FIGS. 7B and D respectively represent a corresponding deflection position. As depicted in FIG. 7B, discharge opening 7.1 is deflected upward in a preferred deflection of head piece 7B in vertical direction $R_V$ in such a way that discharge direction $R_{AUS}$ of the exiting spreading agent defines an angle α with a horizontal plane E1 extending parallel to bottom section 5.1 of base body 5 and including main axis HA of discharge opening 7.1. In a preferred deflection of head piece 7B in horizontal direction $R_H$, discharge opening 7.1 is pivoted in such a way that discharge direction $R_{AUS}$ of the exiting spreading agent defines an angle β with a vertical plane E2 including axis of rotation RA, as depicted in FIG. 7D.

Through corresponding adjustment of discharge units 7, a needs-based adjustment of the spread pattern may be achieved particularly advantageously and the casting distance for the spreading agent may be simultaneously adjusted, in particular increased. In order to achieve a particularly large casting distance, discharge units 7 are deflected upward particularly preferably from the initial position in vertical direction $R_V$ and deflected in horizontal direction $R_H$ counter to directional rotation D of discharge device 4. Discharge openings 7.1 in this preferred position face upward, as shown in FIG. 7B, and simultaneously counter to rotational direction D, as is shown in FIG. 7D. By this means, a substantially crescent shaped jet shape of the jet of spreading agent exiting from discharge openings 7.1 arises, by which means the spread pattern is adjustable to an ideal shape, and the casting distance may be significantly increased.

Figure 8:
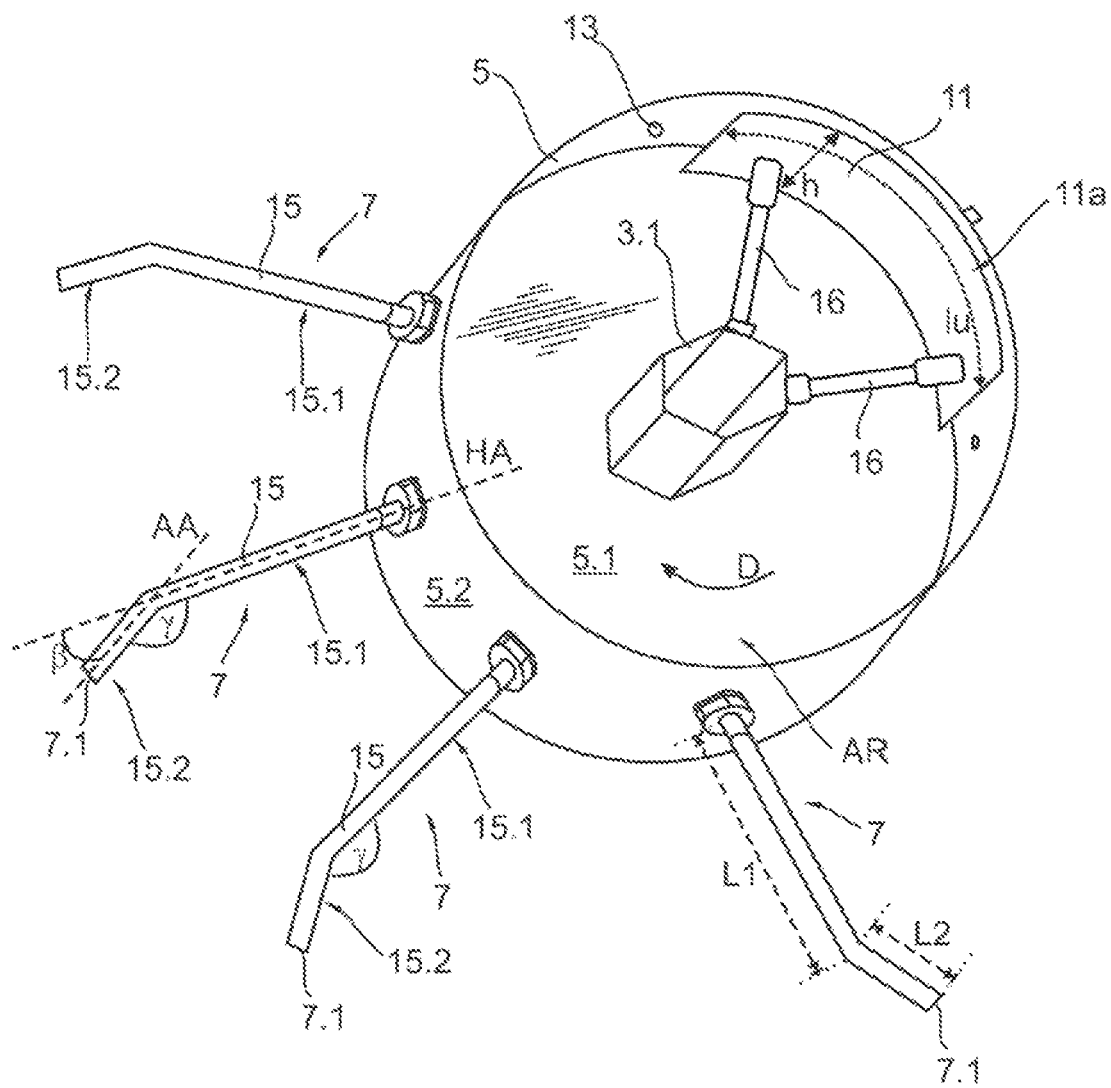
FIG. 8 an alternative embodiment of a base body with discharge units fixed thereon schematically depicted in a perspective view.
Figure 9:
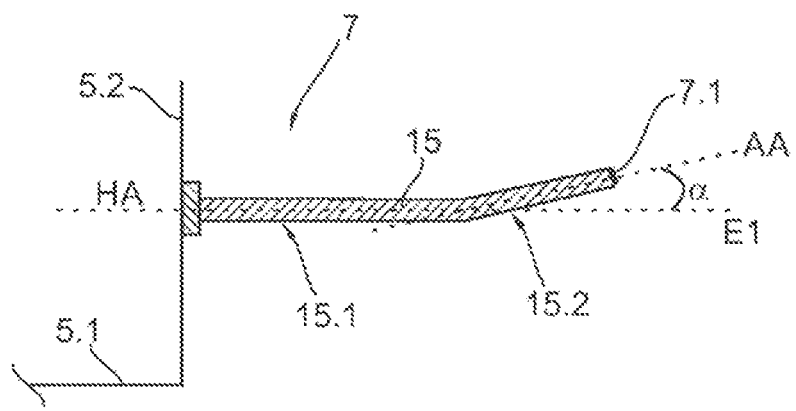
FIG. 9 A shows a vertical cross section of a discharge unit from FIG. 8, and B shows a top view from above of a cross section of the base body with the fixed discharge unit according to FIG. 8.
Figure 9:
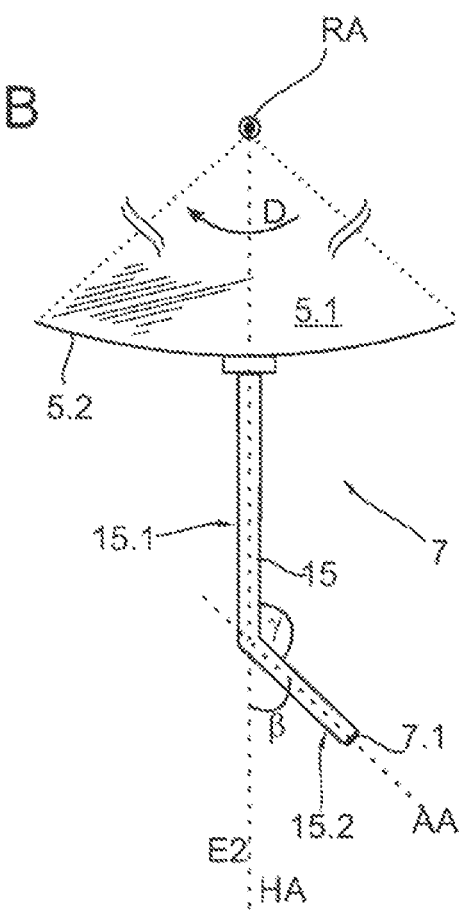

FIGS. 8 and 9 show an alternative, likewise preferred embodiment of a base body 5 with discharge units 7 fixed thereon, wherein FIG. 8 shows a perspective view and FIGS. 9A and 9B represent discharge units 7 of the preferred embodiment in more detail. FIG. 9A thereby shows discharge unit 7 fixed on wall section 5.2 of base body 5 in a vertical cross section extending in a direction of axis of rotation RA and FIG. 9B cross sectionally shows a top view from above.

Cylindrical base body 5 of the alternative embodiment substantially corresponds with respect to its structure and its configuration to those of the embodiments according to FIGS. 4 and 5, wherein a corresponding configuration of base body 5 with cover screen 11 is depicted in FIG. 8 only by way of example. It is naturally understood that base body 5 may also be carried out without cover screen 11.

The embodiment of FIG. 8 differs from that of FIGS. 4 and 5 firstly due to the alternatively designed discharge units 7, of which only four are depicted in FIG. 8 for reasons of better clarity. In the exemplary embodiment variant according to FIG. 8, more discharge units 7 are naturally arranged distributed across the entire periphery of base body 5, wherein the depicted example has twelve discharge units 7 distributed uniformly across the periphery of base body 5. In alternative embodiments, ten or eight discharge units 7 may also be fixed on base body 5.

In the preferred embodiment according to FIGS. 8 and 9A, 9B, discharge units 7 comprise a tubular piece 15 designed as a discharge tube. Tubular piece 15 in the present example is formed by an angled tube and has a first tubular section 15.1 and a second tubular section 15.2. First tubular section 15.1, extending along main axis HA, is connected to wall section 5.2 of base body 5, and second tubular section 15.2, connecting at an angle to first tubular section 15.1 and extending along a discharge axis AA, comprises discharge opening 7.1 at its free end.

Angled tubular piece 15, made from stainless steel, may thus be considered as an extension of discharge units 7, through which discharge openings 7.1 have a predetermined distance from wall section 5.2 of base body 5. Discharge openings 7.1 are thereby arranged on a circle concentrically surrounding wall section 5.2 of base body 5, said circle having a larger radius in comparison to base body radius $r_G$ (see FIG. 3).

For example, first tubular section 15.1 has a first length L1, which corresponds to approximately 1.3 times base body radius $r_G$, and thus to approximately two-thirds of the diameter of base body 5, and is, for example, around 150 mm. Second tubular section 15.2 has a second length L2, which corresponds, for example, to approximately 40% to 50% of first length L1, and is, for example, 60 mm. First and second tubular sections 15.1, 15.2 are adjusted with respect to each other that they define a predetermined angle γ, which is around 135° in the depicted example. An outer diameter of tubular piece 15 lies, for example, in a range from 16 millimeters to 20 millimeters and is preferably around 18 millimeters. At a wall thickness of the material of around 1 millimeters to 2 millimeters, an inner diameter therefore lies in a range from 12 millimeters to 16 millimeters and is preferably around 14 millimeters.

In the depicted example from FIGS. 8 and 9A, 9B, tubular piece 15 is fixed to wall section 5.2 of base body 5 in such a way that first tubular section 15.1 projects away from wall section 5.2 substantially in a radial orientation and second tubular section 15.2 has an orientation deviating from the radial orientation. As indicated in FIG. 9B, discharge opening 7.1 thereby points in a direction counter to rotational direction D, wherein discharge axis AA defines an angle β with a vertical plane E2 including axis of rotation RA, which angle is around 45° in the present example.

Tubular piece 15 may rotate about main axis HA and be fixed at a correspondingly desired position, so that a variable adjustment of discharge units 7 is also possible in this preferred embodiment. For example, tubular piece 15 is thereby adjusted for the optimal adjustment of the casting distance and the spread pattern such that discharge opening 7.1 faces slightly upwards, as indicated in FIG. 9A. Discharge axis AA thereby defines an angle at with a horizontal plane E1, extending parallel to bottom section 5.1 of base body 5 and including main axis HA of discharge unit 7.

Discharge openings 7.1 in this preferred position face counter to rotational direction D and simultaneously upward. By this means, a substantially crescent shaped jet shape of the jet of spreading agent exiting from discharge openings 7.1 is created, by which means the scatter pattern is adjustable to an ideal shape, and the casting distance may be significantly increased. By this means, a large casting distance for the spreading agent may be particularly advantageously achieved of around 12 to 13 m.

Tubular piece 15 may, for example, be fixed to the base body through screwing, wherein the fixing screws are slightly loosed for adjusting by means of rotating about main axis HA and after successful rotation of tubular piece 15 to the desired position, may be tightened again. In discharge units 7 according to FIGS. 8 and 9A, 9B, a tubular piece 15 with a head piece 7a and an assigned fixing ring 7a', depicted as in FIG. 6, may also be respectively assembled into discharge unit 7 and thus fixed on wall section 5.2.

Cover screen 11 of the example depicted in FIG. 8 is held via two working cylinders 16, alternatively to the example from FIG. 5, and pressed against an inner side of wall section 5.2. Naturally, however, struts 11b according to FIG. 5 may also be used for the example from FIG. 8, and vice versa, working cylinder 16 according to FIG. 8 may be used for the example from FIG. 5.

LIST OF REFERENCE NUMERALS

1 Spreading device
2, 2' Tank
3 Supply unit
3.1 Supply connecting piece
3a Supply line
4 Discharge device
5 Base body
5.1 Bottom section
5.2 Wall section
6 Cover
6a Upper side of spreading plate
6b Underside of spreading plate
7 Discharge units
7.1 Discharge opening
7a Base piece
7a' Fixing ring
7b Head piece
8 Guide walls
9 Ball joint section
10 Reservoir
11 Cover screen
11a Screening surface area
11b Struts
12 Inlet opening
13 Outlet openings
14 Impact dome
15 Tubular piece
15.1 First tubular section
15.2 Second tubular section
16 Working cylinder
100 Winter road maintenance vehicle
101 Snowplow
IA Discharge axis
AR Receiving chamber
D Rotational direction
E1 Horizontal plane
E2 Vertical plane
FR Direction of travel
h Height of the screening surface area
HA Main axis
L1 First length
L2 Second length
lu Peripheral length of the screening surface area
O Upper side
RA Axis of rotation
$R_{AUS}$ Discharge direction
$R_H$ Horizontal direction
$r_G$ Base body radius
$r_T$ Plate radius
$R_V$ Vertical direction
U Underside
α, β Angle
γ Angle

The invention claimed is:

1. A spreading device for spreading vehicles for discharging liquid spreading agents, the spreading device comprising: at least one tank for receiving liquid spreading agents to be spread and at least one rotationally-driven discharge device, connected via a supply unit to the at least one tank, wherein the at least one rotationally-driven discharge device has at least one base body and a cover securely connected to the at least one base body, wherein the at least one base body defines a receiving chamber for the liquid spreading agents and is substantially in a shape of a cylinder, wherein the at least one base body has at least one bottom section, forming an underside of the at least one rotationally-driven discharge device, with an inlet opening and at least one wall section projecting from a bottom section and concentrically surrounding an axis of rotation, wherein the at least one rotationally-driven discharge device, for dispensing the liquid spreading agent from the receiving chamber, comprises multiple discharge units, each having a discharge opening, wherein the multiple discharge units are arranged in an area of a wall section of the at least one base body and interact with outlet openings provided in the wall section, the at least one rotationally-driven discharge device dispenses the liquid spreading agent outward from the receiving chamber in a jet through the multiple discharge units due to a centrifugal force generated by a rotation about an axis of rotation, and in that the multiple discharge units are variably adjustable in such a way that a direction of the jet of exiting liquid spreading agent can be adjusted at the discharge opening, wherein the multiple discharge units are distributed uniformly across a periphery of the wall section and spaced apart from one another.

2. The spreading device according to claim 1, wherein each of the multiple discharge units is adjustable in at least one vertical direction in such a way that a free end of each of the multiple discharge units carrying the discharge opening may be deflected in the at least one vertical direction.

3. The spreading device according to claim 1, wherein the multiple discharge units are adjustable in at least a horizontal direction in such a way that a free end of the multiple discharge units, each carrying the discharge opening, may be deflected in the horizontal direction.

4. The spreading device according to claim 1, wherein each of the multiple discharge units is rotatable about a respective main axis for variable adjustment.

5. The spreading device according to claim 1, wherein each of the multiple discharge units is made from multiple parts and comprises at least one base piece for fixing on the wall section of the at least one base body and a head piece articulatedly connected to the at least one base piece and comprising the discharge opening.

6. The spreading device according to claim 5, wherein the head piece comprises a ball joint section and the at least one base piece forms a ball joint socket receptacle for the ball joint section.

7. The spreading device according to claim 1, wherein each of the multiple discharge units are fixed on the wall section of the base body in such a way that a main axis is arranged in a radial orientation with respect to the axis of rotation.

8. The spreading device according to claim 7, wherein the multiple discharge units have tubular pieces or tubular sections and are extended thereby in a direction of the main axis in such a way that the discharge openings have a predetermined distance from an outer surface of the wall section of the base body.

9. The spreading device according to claim 8, wherein each of the multiple discharge units comprises a tubular piece angled tube with a first tubular section and a second tubular section, wherein the first tubular section extends along the main axis and the second tubular section extends along a discharge axis.

10. The spreading device according to claim 9, wherein the first tubular section and the second tubular section define a predetermined angle in a range from 115° to 160°.

11. The spreading device according to claim 1, further comprising a reservoir for receiving solid spreading agents to be spread and at least one conveying and loading unit for applying the solid spreading agent on an upper side of the at least one rotationally-driven discharge device, wherein the spreading device simultaneously discharges liquid and solid spreading agents, wherein the cover of the at least one rotationally-driven discharge device is a shape of a spreading plate for simultaneous discharge of the liquid and solid spreading agents.

12. The spreading device according to claim 11, wherein the cover is a spreading plate that has a plate radius which is greater than a base body radius of the base body.

13. The spreading device according to claim 12, wherein guide walls projecting upward are provided on an upper side of the spreading plate facing away from the base body.

14. The spreading device according to claim 1, wherein a cover screen is provided and is arranged in the receiving chamber, wherein the cover screen is for an inner side shielding of at least one of the outlet openings in the wall section.

15. The spreading device according to claim 14, wherein the cover screen comprises a curved screening surface area, wherein a height of the curved screening surface area and a peripheral length of the curved screening surface area are selected so that the curved screening surface area is adapted to the wall section and completely covers at least one outlet opening.

16. The spreading device according to claim 15, wherein the cover screen is arranged and fixed stationarily in the receiving chamber in a predetermined position, or at least one movable working cylinder is provided which presses the curved screening surface area of the cover screen against an inner side of the wall section.

17. The spreading device according to claim 16, wherein a position of the cover screen is adjustable in a controlled manner.

18. The spreading device according to claim 1, wherein two or more rotationally driven discharge devices are provided, wherein the two or more rotationally driven discharge devices are arranged next to one another or above one another.

19. A rotationally driven discharge device for a spreading device of a spreading vehicle for discharging spreading agents, the rotationally driven discharge device comprising: at least one base body and a cover securely connected to the at least one base body, wherein the at least one base body defines a receiving chamber for supplied liquid spreading agent and is substantially in a shape of a cylinder, wherein the at least one base body comprises at least one bottom section, forming an underside of the rotationally driven discharge device, with an inlet opening and at least one wall section projecting from the bottom section and concentrically surrounding an axis of rotation, wherein the rotationally driven discharge device, for dispensing the liquid spreading agent from the receiving chamber, comprises multiple discharge units, each having a discharge opening, wherein the multiple discharge units are arranged in an area of the wall section of the base body and interact with outlet openings provided in the wall section, wherein the rotationally driven discharge device dispenses the liquid spreading agent outward from the receiving chamber in a jet through the multiple discharge units due to a centrifugal force generated by a rotation about the axis of rotation, and in that the multiple discharge units are variably adjustable in such a way that a direction of the jet of exiting liquid spreading agent can be adjusted at the discharge opening, wherein the multiple discharge units are distributed uniformly across a periphery of the wall section and spaced apart from one another.

* * * * *